(12) United States Patent
Kaminski et al.

(10) Patent No.: US 12,123,857 B2
(45) Date of Patent: Oct. 22, 2024

(54) TECHNIQUES FOR CHECKING STATE OF ANALYZERS

(71) Applicant: Roche Diagnostics Operations, Inc., Indianapolis, IN (US)

(72) Inventors: Marc Kaminski, Penzberg (DE); Stefan Quint, Munich (DE); Benjamin Tiemann, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 1023 days.

(21) Appl. No.: 16/996,225

(22) Filed: Aug. 18, 2020

(65) Prior Publication Data

US 2021/0063363 A1    Mar. 4, 2021

(30) Foreign Application Priority Data

Aug. 27, 2019  (EP) .................................. 19193864

(51) Int. Cl.
| | |
|---|---|
| *G01N 30/72* | (2006.01) |
| *G01N 30/20* | (2006.01) |
| *G01N 30/88* | (2006.01) |
| *G06F 16/28* | (2019.01) |
| *G01N 30/02* | (2006.01) |

(52) U.S. Cl.
CPC ............ *G01N 30/88* (2013.01); *G01N 30/20* (2013.01); *G06F 16/285* (2019.01); *G01N 2030/027* (2013.01); *G01N 2030/202* (2013.01); *G01N 2030/8804* (2013.01)

(58) Field of Classification Search
CPC ....... G01N 2030/027; G01N 2030/202; G01N 2030/8804; G01N 30/20; G01N 30/24; G01N 30/32; G01N 30/8658; G01N 30/88; G06F 16/285
See application file for complete search history.

(56) References Cited

U.S. PATENT DOCUMENTS

| | | |
|---|---|---|
| 4,775,481 A | 10/1988 | Allington |
| 2004/0034479 A1 | 2/2004 | Shimase et al. |
| 2008/0236243 A1 | 10/2008 | Ciolkosz et al. |
| 2015/0233873 A1 | 8/2015 | Yanagisawa |
| 2017/0168028 A1 | 6/2017 | Maeda et al. |

(Continued)

FOREIGN PATENT DOCUMENTS

| | | |
|---|---|---|
| CN | 110008898 A | 7/2019 |
| JP | 2015-021931 A | 2/2015 |

(Continued)

OTHER PUBLICATIONS

European Search Report issued Feb. 5, 2020, in Application No. 19193864.6, 2 pp.

*Primary Examiner* — Mohamed Charioui
*Assistant Examiner* — Christine Y Liao
(74) *Attorney, Agent, or Firm* — Taft Stettinius & Hollister LLP

(57) ABSTRACT

A method of monitoring a state of a liquid chromatography (LC) stream of an automated analyzer is provided including automatically monitoring a system pressure of an injection assembly of the liquid chromatography stream to generate a time series of system pressures, classifying the time series in one of two or more predetermined classes indicating different states of the LC stream and triggering a response based on the classification result.

18 Claims, 5 Drawing Sheets

(56) References Cited

U.S. PATENT DOCUMENTS

2018/0202983 A1* 7/2018 Jung ........................ G01M 3/26
2018/0364205 A1* 12/2018 Beals ...................... G01N 30/34
2021/0063410 A1* 3/2021 Wilcox .............. G01N 33/6848
2022/0050091 A1* 2/2022 Sugiyama ............ G01N 30/466
2022/0341898 A1* 10/2022 Cox ....................... G01N 30/88

FOREIGN PATENT DOCUMENTS

| WO | 2005/091924 A2 | 10/2005 |
| WO | 2013/062624 A1 | 5/2013 |
| WO | 2016/039621 A1 | 3/2016 |
| WO | 2019/135971 A1 | 7/2019 |

* cited by examiner

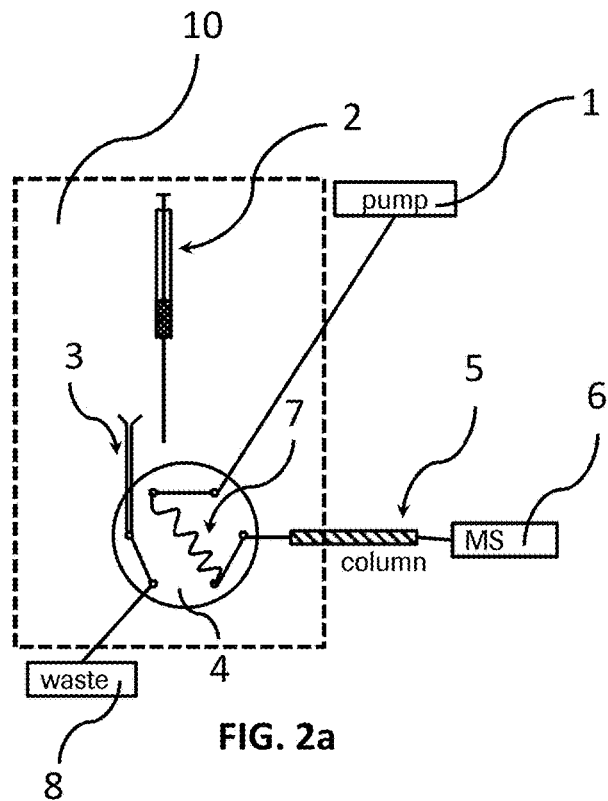
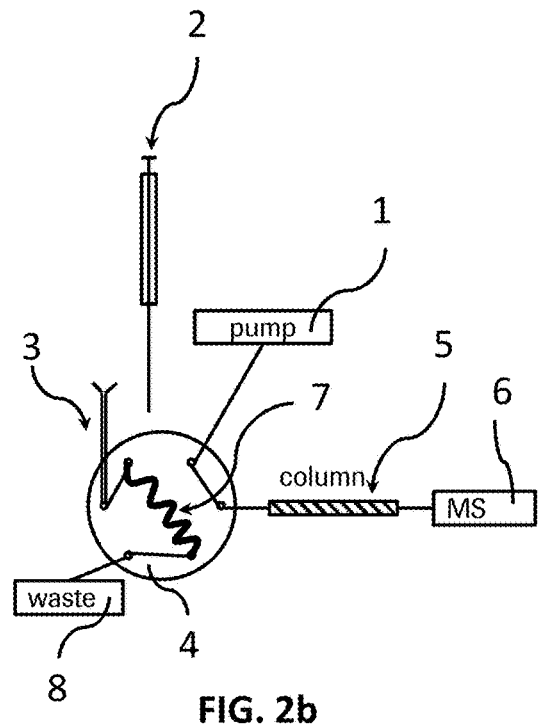
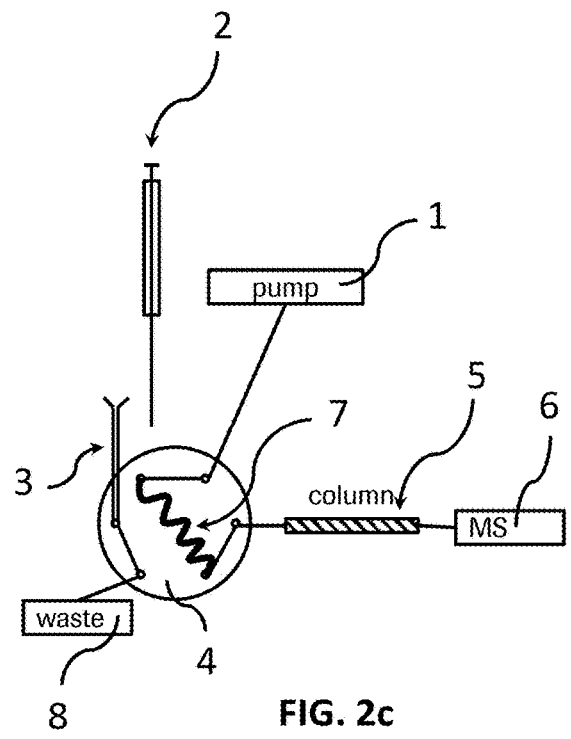
FIG. 2a
FIG. 2b
FIG. 2c

TECHNIQUES FOR CHECKING STATE OF ANALYZERS

CROSS-REFERENCE TO RELATED APPLICATIONS

This application claims priority to European Patent Application No. 19193864.6, filed 27 Aug. 2019, the disclosure of which is hereby incorporated by reference in its entirety.

FIELD OF THE DISCLOSURE

This disclosure relates to automated methods for monitoring a state of a liquid chromatography (LC) stream of an automated analyzer.

BACKGROUND

Automated analyzers (e.g., in-vitro analyzers) are widespread in today's laboratory and hospital environments. These devices tend to become more and more complex due to added functionalities and increased throughput and a requirement to perform analytical tasks in an automated manner. As a consequence, errors and malfunctions can occur in a multitude of components which might lead to decreased productivity of the analyzer or less reliable measurement results. In some examples, external service personnel might be required to spot and fix an error which can take many hours or even days during which an analyzer or part of it might not be available.

SUMMARY

It is against the above background that the present disclosure provides certain unobvious advantages and advancements over the prior art. In particular, the inventors have recognized a need for improvements in techniques for checking state of analyzers.

According to an embodiment of the present disclosure, a method of monitoring a state of a liquid chromatography (LC) stream of an automated analyzer is provided, the method comprising automatically: monitoring a system pressure of an injection assembly of the liquid chromatography stream to generate a time series of system pressures; classifying the time series in one of two or more predetermined classes indicating different states of the LC stream; and triggering a response based on the classification result.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIG. 2a illustrates an injection process in an example LC stream;

FIG. 2b illustrates an injection process in an example LC stream;

FIG. 2c illustrates an injection process in an example LC stream;

Figure 1:
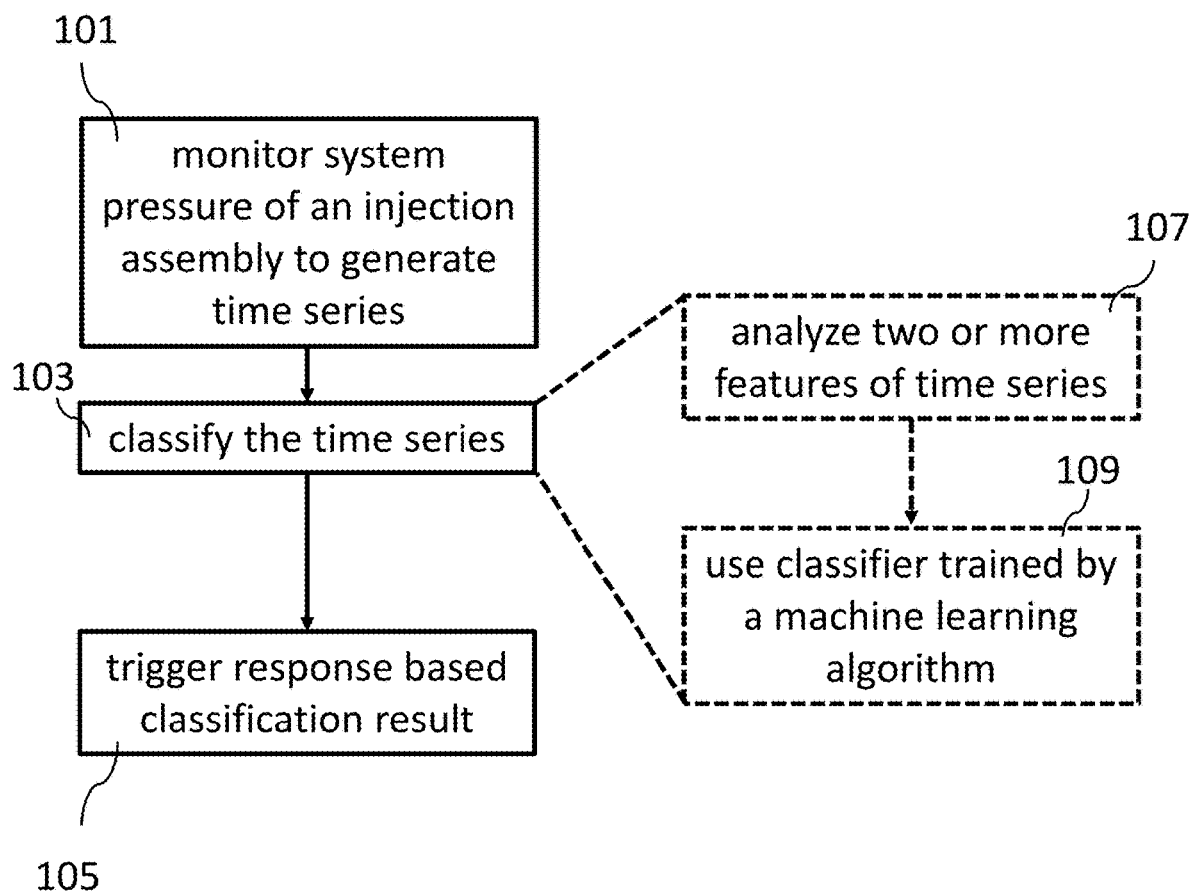
FIG. 1 is a flow diagram of the monitoring technique of the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

In accordance with one first embodiment, the present disclosure relates to a method of monitoring a state of a liquid chromatography (LC) stream of an automated analyzer. The method includes automatically monitoring a system pressure of an injection assembly of the liquid chromatography stream to generate a time series of system pressures, classifying the time series in one of two or more predetermined classes indicating different states of the LC stream, and triggering a response based on the classification result.

In accordance with another embodiment, the present disclosure relates to a computer system being configured to carry out the steps of the technique of the first embodiment of the present disclosure.

Although the embodiments of the present disclosure are not limited to specific advantages or functionality, it is noted that the technique of the first and second embodiments of the present disclosure can have advantageous technical effects.

Firstly, the monitoring technique can be seamlessly integrated into existing analyzer workflows in some examples. For instance, the detecting and/or monitoring technique can be carried out as part of an analyzer initialization workflow. In some examples, the monitoring technique can use monitoring data (e.g., the pressure of a pump used in an injection process) already generally available in the analyzer (e.g., to control the pressurization of parts of the LC stream by the pump). In these cases, no additional hardware might be needed to carry out the detecting and/or monitoring techniques of the present disclosure.

Secondly, the monitoring technique of the present disclosure can be employed to distinguish between different states of the analyzer and trigger particular responses. In this manner, the detecting and/or monitoring technique can facilitate employing resources (e.g., operator time or external service personnel) more efficiently by allowing a more precise allocation of these resources due to an improved knowledge of the state of the analyzer. A downtime of the analyzer (or a module thereof) can also be reduced in some situations as the improved knowledge of the analyzer state can be used to select a most appropriate response.

Thirdly (and related to the second point), the monitoring of the present disclosure can allow that less experienced operators perform service and maintenance operations that might require the involvement of external service personnel when using some known automated analyzers. By classifying the time series in one of two or more predetermined classes indicating different states of the LC stream and triggering a response based on the classification result, a less experienced operator might be able to identify and fix errors and other issues of the LC stream of the automated analyzer.

Several terms are used as having a particular meaning in the present disclosure.

A "time series" according to the present disclosure refers to at least two values (e.g., system pressure) of a particular parameter at two different points in time (e.g., at least one earlier point in time and at least one later point in time). A time series can include (much) more than two values at respective points in time in some examples. The term "point in time" shall not limit a measurement window for obtaining a measurement value included in the time series to a particular accuracy. For instance, an averaged measurement value obtained by averaging over multiple measurements of a parameter can also be included in the time series according to the present disclosure. A time series can include values at equidistant points in time or at non-equidistant points in time. The term "time series" is used in the present disclosure as referring both to "raw data" (e.g., as retrieved from a pressure sensor) as well as processed raw data (e.g., by using signal processing techniques) as long as the processing step still reflects system pressures of the injection assembly.

The terms "automated" or "automatically" according to the present disclosure refers to operations carried out by a machine without user interaction. The automated steps can be part of a method including also steps requiring user interaction. For instance, a user might schedule or trigger the automated steps of the techniques of the present disclosure.

An "automated analyzer" according to the present disclosure is an apparatus dedicated to perform an analytical function. In some examples, the analyzers can be configured to carry out to the analysis of samples (e.g., samples for in vitro diagnostics). For example, an analyzer can be a clinical diagnostics system for performing vitro diagnostics. The automated analyzers of the present disclosure include at least one liquid chromatography (LC) stream.

The analyzers of the present disclosure can have different configurations according to the need and/or according to a desired workflow. Additional configurations may be obtained by coupling a plurality of apparatuses and/or modules together. A "module" is a work cell, typically smaller in size than the entire analyzer, which has a dedicated function. This function can be analytical but can be also pre-analytical or post-analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps.

In particular, the analyzers can comprise one or more analytical devices, designed to execute respective workflows that are optimized for certain types of analysis.

The analyzer can include analytical apparatuses for one or more of clinical chemistry, immunochemistry, coagulation, hematology, etc.

Thus, the analyzer may comprise one analytical apparatus or a combination of any of such analytical apparatuses with respective workflows, where pre-analytical and/or post analytical modules may be coupled to individual analytical apparatuses or be shared by a plurality of analytical apparatuses. Alternative pre-analytical and/or post-analytical functions may also be performed by units integrated in an analytical apparatus. The analyzer can comprise functional units such as liquid handling units for pipetting and/or pumping and/or mixing of samples and/or reagents and/or system fluids, and also functional units for sorting, storing, transporting, identifying, separating, and/or detecting.

The term "sample" refers to a biological material suspected of containing one or more analytes of interest and whose detection, qualitative and/or quantitative, may be associated to a particular condition (e.g., a clinical condition).

The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents, e.g., to enable carrying out one or more in vitro diagnostic tests, or for enriching (extracting/separating/concentrating) analytes of interest and/or for removing matrix components potentially interfering with the detection of the analyte(s) of interest.

The term "sample" is tendentially used to indicate either a sample before sample preparation or a sample after sample preparation or both.

Examples of analytes of interest are vitamin D, drugs of abuse, therapeutic drugs, hormones, and metabolites in general. The list is however not exhaustive.

In particular, the analyzer can comprise a sample preparation station for the automated preparation of samples. A "sample preparation station" is a pre-analytical module coupled to one or more analytical apparatuses or a unit in an analytical apparatus designed to execute a series of sample processing steps aimed at removing or at least reducing interfering matrix components in a sample and/or enriching analytes of interest in a sample. Such processing steps may include any one or more of the following processing operations carried out on a sample or a plurality of samples, sequentially, in parallel, or in a staggered manner: pipetting (aspirating and/or dispensing) fluids, pumping fluids, mixing with reagents, incubating at a certain temperature, heating or cooling, centrifuging, separating, filtering, sieving, drying, washing, resuspending, aliquoting, transferring, storing . . . ).

A sample may be provided for example in sample containers such as sample tubes, including primary tubes and secondary tubes, or multi-well plates, or any other sample carrying support. Reagents may be arranged for example in the form of containers or cassettes containing individual reagents or group of reagents and placed in appropriate receptacles or positions within a storage compartment or conveyor. Other types of reagents or system fluids may be provided in bulk containers or via a line supply.

Unless specified differently in the respective context, the terms "about" in connection with values for parameters means to include a deviation of +/−10% from the specified value in the present disclosure.

In order that the embodiments of the present disclosure may be more readily understood, reference is made to the following examples, which are intended to illustrate the disclosure, but not limit the scope thereof.

First, an overview over the monitoring techniques of the present disclosure will be given in connection with FIG. 1.

In the subsequent sections, further aspects of the monitoring technique will be discussed in connection with FIG. 2a to FIG. 5.

General Overview

FIG. 1 is a flow diagram of the monitoring technique of the present disclosure.

The method includes automatically monitoring 101 a system pressure of an injection assembly of the liquid chromatography stream to generate a time series of system pressures, classifying 103 the time series in one of two or more predetermined classes indicating different states of the LC stream, and triggering 105 a response based on the classification result.

The monitoring and classifying steps will be discussed in more detail in the following sections.

In some examples the monitoring takes place during an injection process of a sample. For example, the injection process can include injecting a sample into an LC column of the LC stream. The system pressure can be generated by a pump connected to the injection assembly (e.g., an elution pump of the automated analyzer for injecting the sample into a column of the LC stream). Further aspects of the components for monitoring the system pressure and the components of the injection assembly will be discussed in connection with FIGS. 2a-c below.

The time series can span at least a portion of an injection process of the sample into a column of the LC stream (e.g., more than 20% or more than 50% of a duration of an injection process, or a window of up to 20% or up to 50% of the duration of an injection process). In some examples, the time series can span a complete injection process of a sample into a column of the LC stream. In all cases, a period of time during which the injection takes place can be a focus of the monitoring techniques of the present disclosure. The pressure curves obtained during this period of time can be interesting to derive different states of the LC stream as discussed herein.

In some cases, an LC gradient having a particular pressure characteristic follows the sample injection process. This part of a pressure time series can be of less interest for the techniques of the present disclosure. Therefore, no pressure values are sampled during the duration of the LC gradient in some examples. In addition, in some examples the time series includes no pressure value sampled prior to the injection process. However, in some examples a time series can span at least a part of an injection process of a sample and periods in time before and/or after the injection process of the sample. For instance, the time series can include a time period prior to the injection process and a part (or a complete duration) of the injection process into an LC column of the LC stream.

The classifying step will be discussed next. As part of the classifying step, the time series can be automatically processed to facilitate determining which of the two or more classes is the appropriate class for a current time series. In some examples, classifying the time series includes a feature analysis of the time series (e.g., a features analysis of multiple predetermined features of the time series). The class determination can then include selecting an appropriate class based on the determined features of the time series. The features can be dynamically adapted or updated during the operation of the automated analyzer.

In some examples, classifying the time series includes using a classifier trained by a machine learning algorithm. In this context, the term "trained" means that the classifier is executed on a plurality of training samples in a training period during which the properties of the classifier are adapted to yield or improve a classification result. The training can happen prior to delivery of the automated analyzer or its control software and/or after the automated analyzer or its control software have been deployed (e.g., at a customer). As discussed before, the classifier can be periodically or continuously updated.

The classifier can be trained on historical pressure time series or on simulated pressure time series in some examples. The classifier can be updated based on pressure time series of the automated analyzer and/or different automated analyzers in some examples (e.g., data of different automated analyzers can be collected a processed to train the classifier and the so trained classifier can be provided to the automated analyzer).

In some examples, the classifier can be trained on metadata generated by processing time series (e.g., a feature analysis as described in the present disclosure). In this example, the classifying step can include an initial processing step of the time series to generate metadata and a subsequent step of applying the classifier. However, in other examples, the classifier can be trained and used by directly processing the time series. Further aspects of processing the times series will be discussed below in connection with FIG. 3 and FIG. 4.

The classifier can be model-based or model-free in some examples.

In some examples, the classifier can employ an artificial neural network. The artificial neural network can be trained on sample data as discussed above.

In other examples, the classifier can employ other algorithms trained by machine learning techniques. For instance, numerical pattern recognition techniques can be employed in the classification step of the monitoring technique of the present disclosure. In other examples, classification can include using a decision tree algorithm, a probabilistic classifier (e.g., a classifier using a Naïve Bayes-type algorithm), a support vector machine, a correlation classifier, a nearest-neighbor type classifier, or other suitable numerical classification techniques trained by machine learning techniques.

In still other examples, other numerical classification techniques not trained by machine learning techniques can be used. For instance, some of the algorithms can be configured with explicit instructions to classify the time series in one of two or more predetermined classes. For example, a rule based classification technique can be configured with explicit instructions to classify the time series. However, machine learning techniques might be superior to techniques requiring explicit instructions for some classification techniques in some situations.

In the above described manner, the monitoring technique of the present disclosure can be used to automatically retrieve information regarding different states of the analyzer. The system pressure curves of the injection assembly contain information that can be automatically retrieved by using the techniques of the present disclosure to improve operation (e.g., reduce downtime) of the automated analyzer.

Automated Analyzers

In the following sections additional aspects of the components of the automated analyzer and the injection assembly will be discussed in connection with FIGS. 2a, 2b and 2c. FIG. 2a, FIG. 2b and FIG. 2c illustrate these components and an injection process of an LC stream.

FIG. 2a illustrates an injection assembly 10 and an LC column 5 of an LC stream connected to the injection assembly 10. Moreover, a mass spectrometer 6 is connected to the LC column 5. The injection assembly 10 is configured to inject samples into the LC column 5. In the LC column 5 the sample is separated into its constituents (in time). The separated constituents of the sample are introduced into the mass spectrometer to resolve the mass to charge ratios of the constituents (or of fragments thereof).

The injection assembly includes an injection port 3 for inputting a sample into the injection assembly 10 and a transfer system 4, 7 for transferring a sample from the injection port to a port of the LC column 5 of the LC stream. The injection assembly 10 is connected to a pump 1 and a waste container 8. The transfer system 4, 7 is configured to switch between different states connecting two or more of the pump 1, the waste container 8, the injection port and the port of the LC column 5 in different configurations. In the example of FIG. 2a, the transfer system 4, 7 includes a rotary valve 4 and a sample loop 7. In addition, the injection system 10 includes a sample dispensing component 2 (e.g., an automated syringe).

The sample injection process can happen as follows:

In a first step as shown in FIG. 2a, a sample can be aspirated from a vial or other sample container into the sample dispensing component 2. During this operation the injection port 3 is connected to the waste container 8. In a further step depicted in FIG. 2b, the injection valve 3 switches to a load position in which the sample loop 7 connects the injection port 3 and the waste container 8. The sample dispensing component 2 (e.g., an automated syringe) transfers the sample through the injection port 3 into the sample loop 7. In some examples, the amount of sample transferred can be several microliters (e.g., less than 10 microliters).

Figure 3:
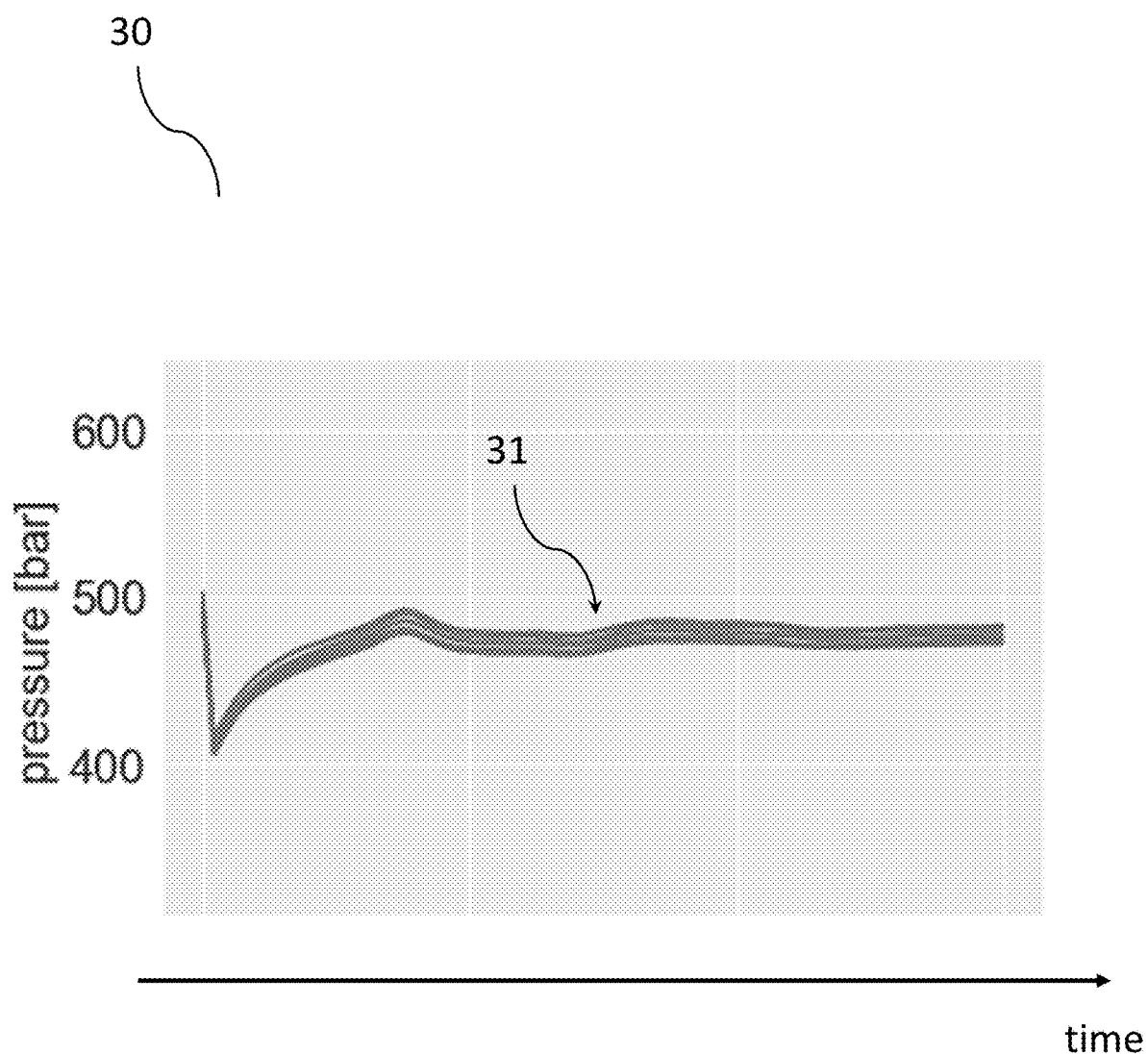
FIG. 3 depicts an example set of system pressure time series of multiple injection processes.

In a further step shown in FIG. 2c, the injection valve 3 switches the sample loop 7 to an injection position. In the injection position, the pump 1 is connected to the sample loop 7 at one end of the sample loop 7. The other end of the sample loop 7 is connected to the LC column 5. In this position, the pump pressurizes the fluid path including the sample loop 7 to inject the sample to the LC column 5 (where it can be further processed as discussed above). A system pressure of the injection assembly 10 during this injection process (during the complete injection process or part thereof) can be monitored to generate a time series further processed in the techniques of the present disclosure. FIG. 3 shows an example set of time series which can be obtained.

For instance, the system pressure can be monitored by a pressure sensor arranged in the injection assembly 10 or the components attached to the injection assembly. For instance, a pressure sensor of the pump 1 can be used to monitor the system pressure. This pressure sensor can be already provided, e.g., to detect failures of the pump 1 or for monitoring pressurization operations performed by the pump 1. In other examples, a pressure sensor can be arranged elsewhere in the injection assembly 10 or in components of the LC stream connected to the injection assembly 10 to monitor the system pressure of the injection assembly 10.

The system pressure can be monitored directly (by a pressure sensor) or indirectly by using any sensor capable of monitoring a parameter directly related to the system pressure in some examples.

It should be pointed out that the layout of FIGS. 2a, 2b and 2c is only exemplary. The monitoring techniques of the present disclosure can also be applied if the one or more LC streams of the automated analyzer are set up differently. For example, the injection assembly 10 can include different components from a rotary valve.

Moreover, the LC column 5 of the LC stream can be coupled to other detectors than the mass spectrometer 6 (alternatively or in addition). For example, the detector can be an optical or magnetic detector configured to analyze the sample provided by the LC column 5.

In addition or alternatively, the fluid path connecting the injection assembly 10 and the LC column 5 can be arranged differently. For instance, the fluid path can include additional components (e.g., additional valves or capillaries). In some examples, the injection assembly 10 can be coupled to a plurality of LC columns of a plurality of LC streams (e.g., by providing a stream selection valve). In addition, the automated analyzer can include multiple injection assemblies as discussed above (e.g., for multiple LC streams). In this case, the monitoring technique of the present disclosure can be employed to automatically monitor a system pressure of multiple or each of the injection assemblies (in parallel or at different times).

Regardless of the layout of the LC stream(s) of the automated analyzer, the monitoring techniques of the present disclosure can be applied.

Details of Processing Time Series

In the subsequent sections, different aspects of processing the time series of system pressure of the monitoring techniques of the present disclosure will be discussed in more detail in connection with FIG. 3. FIG. 3 depicts an example set 31 of system pressure time series of multiple injection processes.

As can be seen, the pressure drops at the beginning of the injection process and subsequently rises again (e.g., over a period of less than 3 minutes or less than 2 minutes). In general, the shape of the pressure curve can be explained as follows: A sample and additional liquid, as well as additional air gaps are not pressurized when they reside in a sample loop (e.g., of an injection assembly as discussed above). At the moment the injection valve is switched the pressurized system is opened to the loop (which is not pressurized) and an equilibration takes place. This can cause the initial pressure drop. In the subsequent period of time the content of the sample loop is pressurized to the system pressure. When the content of the sample loop is pressurized to the system pressure a pressure prior to the switching event of the injection valve is obtained.

The time series of system pressures can be pre-processed in some examples. For instance, a single time series of system pressures can be smoothed or aberrant values can be removed. In addition or alternatively, multiple time series (e.g., each spanning at least part of a single injection process) can be averaged. The averaged time series can then be further processed. In still further examples, one or more portions of the times series can be removed.

In some examples, one or more features (e.g., a plurality of features) are extracted from the time series. These features can relate to one or more of a pressure value at a predetermined position (e.g., a pressure value at a maximum or minimum in the time series), a magnitude of a change in pressure (e.g., a pressure rise or pressure drop), a speed of a change in pressure.

In addition or alternatively, the feature can relate to a global characteristic of the time series. For example, a feature can quantify a number of maxima and minima of a time series or a number of oscillations. In addition or alternatively, a feature can be a spectral feature of the time series. For instance, a feature can relate to a magnitude at a particular frequency (i.e., a magnitude of a Fourier coefficient) or a relate to a spectral energy at a particular frequency. In still other examples, a feature can relate to a global or local extremum of the time series (e.g., a global maximum, a local maximum, a global minimum or a local minimum). Other features can combine different of the above described features in a meta-feature.

The so extracted features can be organized in any suitable form (e.g., as a feature vector) and input into the classifier. As discussed above, the classifier can be any type of classifier suitable for classifying the extracted features (e.g., a feature vector) into two or more classes indicating different states of the LC stream. In one example, the classifier is a classifier trained by a machine learning algorithm.

In still other examples, the time series can be directly used as an input for the classifier. In these examples, no prior feature extraction step takes place. However, there might be signal processing steps to bring the times series in a suitable form for inputting it in the classifier (e.g., one or more of the pre-processing steps discussed above). For example, a time series can be directly used as an input for an artificial neural network or another classifier trained by machine learning.

Classes and Responses

In the subsequent sections different possible classes and example responses will be discussed in more detail in connection with FIG. 4 and FIG. 5.

Figure 4:
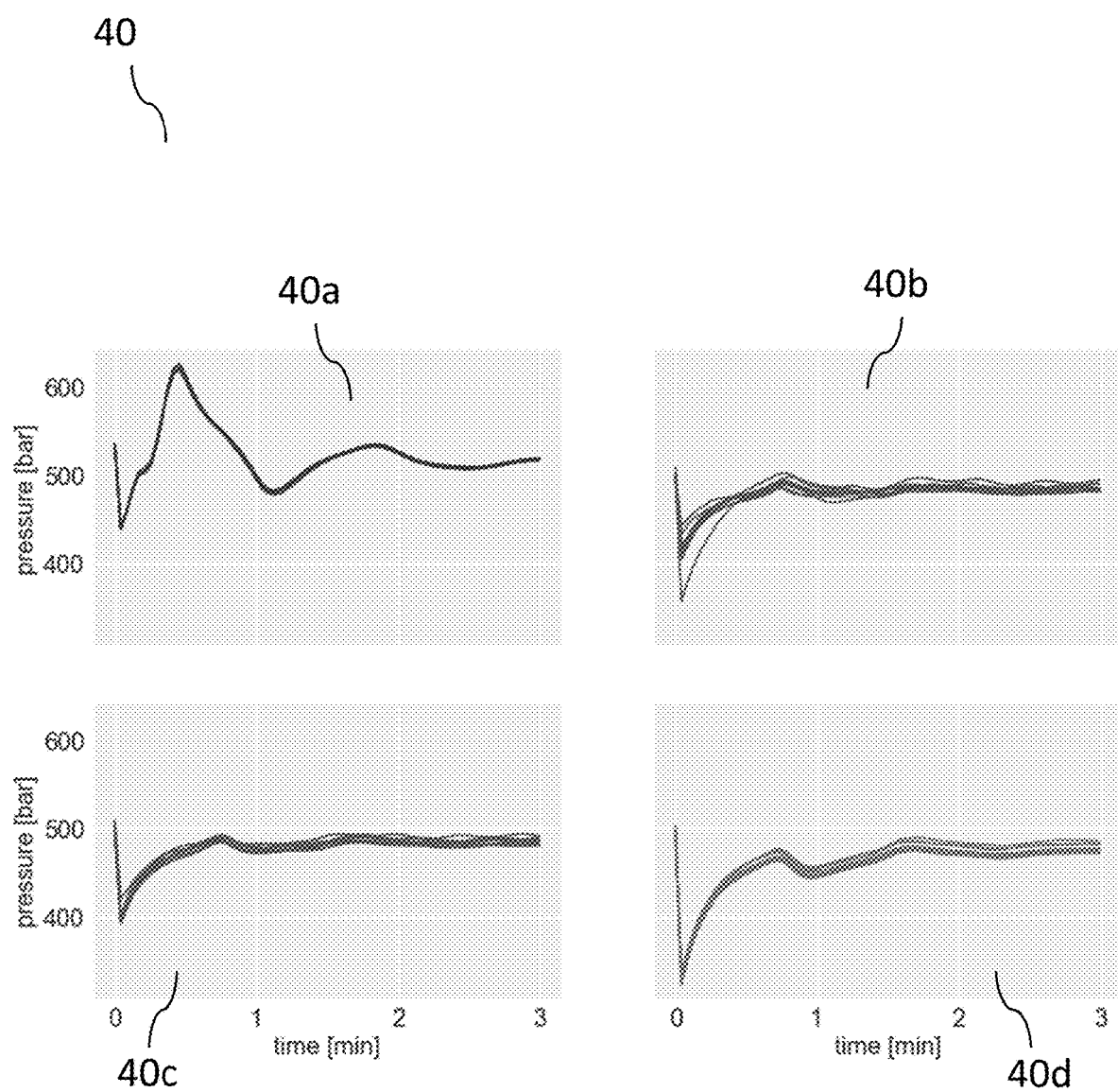
FIG. 4 shows four different sets of system pressure times series of injection processes when one of different error states of the LC stream occurs.

FIG. 4 shows four different sets of system pressure times series 40 of injection processes when one of different error states of the LC stream occurs. In one example, each of the error states can belong to a different class of states of the LC stream.

In some examples, the two or more predetermined classes include at least one class indicative of an injection of gas into the injection assembly. For instance, the two or more classes can include at least two classes (or three or more classes or four or more classes) indicative of an injection of different quantities of gas. The gas can be air or a different gas in the ambient environment of the automated analyzers.

The curves on the right side of FIG. 4 are example curves monitored when a lower amount of air (e.g., 1 µL—upper right curves 40b) and a higher amount of air (e.g., 5 µL—lower right curves 40d) are injected. It can be seen that the curves have a generally more pronounced dip at the start of the injection process compared to the curves measured during normal operation within specification of the injection assembly as shown in FIG. 3 (i.e., the pressure minimum at the start of the injection process is at a lower pressure value if gas is injected). This can happen due to a higher compressibility of air or other gases compared to the sample. In this manner, a pressurization of a volume of the injection assembly including the sample and, e.g., a quantity of air leads to a greater compression of the volume and thus a lower pressure compared a case in which no gas is present.

In addition or alternatively, the two or more predetermined classes include at least one class indicative of an injection of a sub-nominal amount of sample injected in an injection process (e.g., two or more classes indicative of two different levels of sub-nominal amount of sample). For instance, a class can indicate that an amount of sample is below a threshold percentage of a nominal amount of sample (e.g., less than 90% of a nominal amount or less than 50% of a nominal amount). In other examples, a first class can indicate that an amount of sample is in a first range a sub-nominal sample volumes and a second class can indicate that an amount of sample is in a second range of sub-nominal sample volumes lower than the first range. The set of curves 40c on the lower left side of FIG. 4 are monitored curves measured while an amount of sample is sub-normal (e.g., 1 µL instead of a nominal amount of 5 µL). The differences between the curves in this state and the normal state are not clearly visible. Nevertheless, the automated classifiers of the present disclosure can distinguish the two classes based on the time series.

In addition or alternatively, the two or more predetermined classes include at least one class indicative of an injection of an above normal amount of sample injected in an injection process (e.g., two or more classes indicative of two different levels of above normal amounts of sample).

In addition or alternatively, the two or more predetermined classes include at least one class indicative of an abnormal sample composition. For instance, the abnormal sample composition is a composition including at least one unexpected substance (e.g., an unexpected organic substance). In other examples, the abnormal sample composition is a composition in which an expected substance is missing. The set of curves on the upper left side 40a of FIG. 4 are monitored curves measured during an injection of water instead of a mixture of water with an organic component. It can be seen that the time series can have an oscillating characteristic with several minima and maxima in this case.

In addition or alternatively, the two or more predetermined include at least one class indicative of a defect injection valve. This can mean that time series is a (substantially) flat curve (not shown on FIG. 4). Other classes can be indicative of other defects in components of the injection assembly.

In addition or alternatively, the two or more predetermined include at least one class indicative of particles being present in the injected sample (not shown on FIG. 4).

In some examples, the two or more classes include at least one class indicative of a normal operation of the injection assembly and at least one class indicative of an error state of the injection assembly. In one example, the classifier only has two classes, one class indicative of a normal behavior and a second class indicative of an abnormal behavior (e.g., combining two or more or all of the abnormal behaviors discussed above). In this case, the classifier performs a binary classification. In other examples, the classifier only has three or more classes, one class indicative of a normal behavior and two or more classes indicative of different abnormal behaviors (e.g., including two or more or all of the abnormal behaviors discussed above). In this case, the classifier performs a multi-label classification.

The classification based on the time series of pressure values can happen with a high precision. However, it is understood that the classification might not work optimally (e.g., not every time the LC stream is in a certain state—e.g., a quantity of air is injected—the classifier will obtain a corresponding classification result). In some examples, a particular state is only assumed and/or a particular response is only triggered if a plurality of injection processes are classified in a particular class.

In all cases, the monitoring technique of the present disclosure can include automatically triggering a response. Example responses which can be triggered by the classification will be discussed in the following section. Different example responses listed below can be combined as a response in case a particular class indicating a state of the LC stream is detected.

In some examples, the response includes logging the classification result. For instance, the response of logging the classification result can be triggered if the classification of the time series yields a normal operation of the injection assembly. In other examples, the response of logging the classification result happens for each classification operation.

In addition or alternatively, the response can include starting or scheduling an automatic maintenance operation. For instance, the maintenance operation can be one or more of checking the injection assembly for bubbles or checking a sample dilution process. The response of starting or scheduling an automatic maintenance operation can be triggered if the classification of the time series yields an abnormal sample composition.

In addition or alternatively, the response can include generating an error message. This response can be triggered whenever the classification yields a result that the injection assembly does not operate within specification.

In addition or alternatively, the response can include asking an operator to perform a predetermined check or maintenance operation. This can include outputting a message on an interface (e.g., a graphical user interface) for the operator. The message can include information regarding the predetermined check or maintenance operation (e.g., instructions how to perform the predetermined check or maintenance operation).

For instance, the maintenance operation is one or more of checking the injection assembly for bubbles or checking a sample dilution process. The response of asking an operator to perform a predetermined check or maintenance operation can be triggered if the classification of the time series yields an injection of gas into the injection assembly.

In addition or alternatively, the response can include informing a service provider.

In some examples, the response can include flagging that one or more measurements carried out on one or more samples using the LC stream might be erroneous. In addition or alternatively, a response can be stopping the operation of the automated analyzer or a module of the automated analyzer (e.g., a particular LC stream or a column of an LC stream).

Two or more of the above discussed responses can be triggered if the classification result is that the LC stream is in a particular state. For instance, logging the classification result and generating an error message can be triggered for a particular abnormal state of the LC stream.

Example Monitoring Technique

Figure 5:
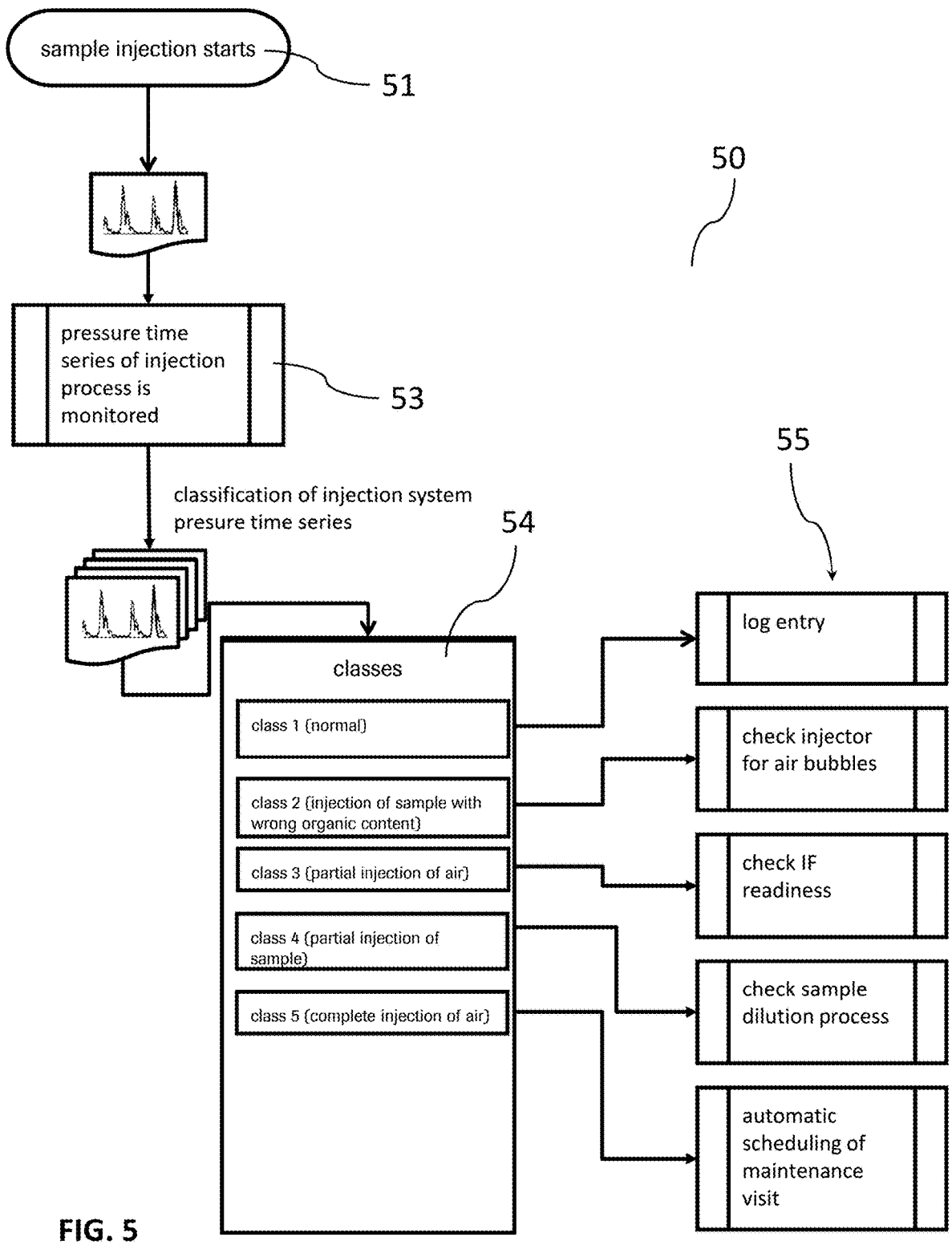
FIG. 5 is a flow diagram of an example monitoring technique of the present disclosure.

FIG. 5 is a flow diagram 50 of an example monitoring technique of the present disclosure. In one step 52, a sample injection process in an injection assembly of an LC stream starts. The injection process is monitored 53 to obtain a system pressure time series (or multiple time series spanning multiple injection processes. The obtained time series can be pre-processed for classification. In a further step, a classification of the times series takes place. In the example of FIG. 5, the classifier can distinguish between five different classes and triggers a particular response for each class.

A first class (class 1) indicates of a normal operation of the injection assembly. In other words, the injection assembly operates according to specification. The triggered response includes generating an entry in a log (e.g., of a control software of the automated analyzer). An entry in the log can include information that the classification result has yielded normal operation of the injection assembly. In addition or alternatively, the entry in the log can include information related to the time series of system pressure (e.g., the time series of system pressures).

A second class (class 2) indicates that a sample with a wrong organic content has been injected. This is a class indicating an abnormal sample composition as discussed above. A triggered response to the detection of this class can be triggering a checking process of an injector of the injection assembly for air bubbles. This can involve a message to an operator of the automated analyzer or service personnel (e.g., including instructions regarding how to conduct the checking process). In other examples, the checking process can be executed (at least partially) automatically by the automated analyzer.

A third class (class 3) indicates a partial injection of air. As discussed above, this class might include cases where a particular fraction (but not the complete sample volume) of the nominal sample volume is occupied by air. Determination that the LC stream is in this state can trigger a response including a message to the operator to check if a minimum amount of sample is provided and following instructions for this case ("check for IF readiness").

A fourth class (class 4) indicates a partial sample injection. This is an example of a class indicative of a sub-normal amount of injected sample discussed above. A triggered response to the detection of this class can be triggering a checking process of sample dilution process. This can involve a message to an operator of the automated analyzer or service personnel (e.g., including instructions regarding how to conduct the checking process). In other examples, the checking process can be executed (at least partially) automatically by the automated analyzer.

A fifth class (class 5) is indicative of a complete injection of air. Determination that the LC stream is in this state can trigger a response including automatically scheduling a maintenance visit (e.g., of external service personnel). The automatic scheduling process can include sending a message to service personnel in some examples.

The set of five different classes depicted in FIG. 5 is only exemplary. As discussed above, a multitude of different classes indicating different states of an LC stream can be distinguished when using the techniques of the present disclosure.

Computer-Implementation

The present disclosure also relates to a computer system being configured to carry out the techniques of monitoring a state of a liquid chromatography (LC) stream of an automated analyzer.

In some examples, the computer system can be a controller of the analyzer (or part thereof). However, in other examples, the computer system can be only connected to the analyzer through a network and not be part of the controller of the analyzer. For instance, the computer system can be a hospital or laboratory management system, or a computer system of a vendor or service provider of the analyzers.

It is merely required that the computer system obtains the time series of system pressures of an injection assembly of the liquid chromatography stream. This can mean that the computing system receives this information over a network. However, in other examples, as discussed above, the computing system also controls functions of the analyzer (e.g., measuring pressures or triggering responses) which means that it the controller of the analyzer.

The computing systems of the present disclosure are not limited to a particular software or hardware configuration. As long as a software or hardware configuration is capable of carrying out the steps of the techniques for monitoring a state of a liquid chromatography (LC) stream of an automated analyzer according to the present disclosure the computing system can have this software or hardware configuration.

The present disclosure also relates to a computer-readable medium having instructions stored thereon which when carried out by a computer system prompt the computer system to carry out the steps of the techniques for monitoring a state of a liquid chromatography (LC) stream of an automated analyzer according to the present disclosure.

Further disclosed and proposed is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of method steps as disclosed herein may be performed by using a computer or a computer network, preferably by using a computer program.

Further disclosed and proposed is a computer program product having program code, in order to perform the method according to the present disclosure in one or more of the embodiments enclosed herein when the program is executed on a computer or computer network. Specifically, the program code may be stored on a computer-readable data carrier.

Further disclosed and proposed is a data carrier having a data structure stored thereon, which, after loading into a computer or computer network, such as into a working memory or main memory of the computer or computer network, may execute the method according to one or more of the embodiments disclosed herein.

Further disclosed and proposed is a computer program product with program code stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Further disclosed and proposed is a modulated data signal which contains instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing measurements.

Further disclosed and proposed is a computer, or computer network, comprising at least one processor, wherein the processor is adapted to perform the method according to one of the embodiments described in this description.

Further disclosed and proposed is a computer loadable data structure that is adapted to perform the method according to one of the embodiments described in this description while the data structure is being executed on a computer.

Further disclosed and proposed is a storage medium, wherein a data structure is stored on the storage medium and wherein the data structure is adapted to perform the method according to one of the embodiments described in this description after having been loaded into a main and/or working storage of a computer or of a computer network.

Further Aspects

A number of aspects of the techniques for monitoring a state of a liquid chromatography (LC) stream of an automated analyzer of the present disclosure have been discussed in the preceding sections. In addition, the techniques for monitoring a state of a liquid chromatography (LC) stream of an automated analyzer of the present disclosure can also be carried out according to the following embodiments. Summarizing the findings of the present disclosure, the following embodiments are typical:

Embodiment 1. A method of monitoring a state of a liquid chromatography (LC) stream of an automated analyzer, the method comprises automatically:
  monitoring a system pressure of an injection assembly of the liquid chromatography stream to generate a time series of system pressures;
  classifying the time series in one of two or more predetermined classes indicating different states of the LC stream; and
  triggering a response based on the classification result.

Embodiment 2. The method of embodiment 1, wherein the monitoring takes place during an injection process of a sample.

Embodiment 3. The method of embodiment 1 or embodiment 2, wherein the system pressure is generated by a pump connected to the injection assembly.

Embodiment 4. The method of any one of embodiments 2 or 3, wherein the time series spans at least a portion of an injection process of the sample into an LC column of the LC stream.

Embodiment 5. The method of any one of embodiments 1 to 4, wherein classifying the time series includes using a classifier trained by a machine learning algorithm.

Embodiment 6. The method of embodiment 5, wherein the classifier is trained on historical pressure time series or on simulated pressure time series.

Embodiment 7. The method of any one of embodiments 1 to 6, wherein classifying the time series includes a feature analysis of one or more predetermined features of the time series.

Embodiment 8. The method of embodiment 7, wherein the one or more features include one or more of a pressure value at a predetermined position, a magnitude of a change in pressure, a speed of a change in pressure, a number of maxima and minima of a time series, a number of oscillations of the time series or a spectral feature of the time series.

Embodiment 9. The method of any one of the preceding embodiments 1 to 8, wherein the two or more predetermined classes include at least one class indicative of an injection of gas into the injection assembly.

Embodiment 10. The method of embodiment 9, wherein the two or more classes include at least two classes indicative of an injection of different quantities of gas.

Embodiment 11. The method of any one of the preceding embodiments 1 to 10, wherein the two or more classes include at least one class indicative of an injection of a sub-nominal amount of sample and/or indicative of an injection of an above normal amount of sample.

Embodiment 12. The method of any one of the preceding embodiments 1 to 11, wherein the two or more classes include at least one class indicative of an abnormal sample composition.

Embodiment 13. The method of embodiment 12, wherein the abnormal sample composition is a composition including at least one unexpected substance, optionally an unexpected organic substance, or a composition in which an expected substance is missing.

Embodiment 14. The method of any one of the preceding embodiments 1 to 13, wherein the two or more classes include at least one class indicative of a normal operation of the injection assembly.

Embodiment 15. The method of any one of the preceding embodiments 1 to 14, wherein the response includes logging the classification result.

Embodiment 16. The method of embodiment 15, wherein the response of logging the classification result is triggered if the classification of the time series yields a normal operation of the injection assembly.

Embodiment 17. The method of any one of the preceding embodiments 1 to 16, wherein the response includes starting or scheduling an automatic maintenance operation.

Embodiment 18. The method of embodiment 17, wherein the maintenance operation is one or more of checking the injection assembly for bubbles or checking a sample dilution process.

Embodiment 19. The method of embodiment 17 or embodiment 18, wherein the response of starting or scheduling an automatic maintenance operation is triggered if the classification of the time series yields an abnormal sample composition.

Embodiment 20. The method of any one of the preceding embodiments 1 to 19, wherein the response includes generating an error message.

Embodiment 21. The method of any one of the preceding embodiments 1 to 20, wherein the response includes asking an operator to perform a predetermined check or maintenance operation, optionally including providing instructions regarding the respective check or maintenance operation.

Embodiment 22. The method of embodiment 21, wherein the check or maintenance operation is one or more of checking the injection assembly for bubbles or checking a sample dilution process.

Embodiment 23. The method of embodiment 21 or embodiment 22, wherein the response of asking an operator to perform a predetermined check or maintenance operation is triggered if the classification of the time series yields an injection of gas into the injection assembly.

Embodiment 24. The method of any one of the preceding embodiments 1 to 23, wherein the response includes informing a service provider.

Embodiment 25. The method of any one of the preceding embodiments 1 to 24, wherein the injection assembly includes an injection port for inputting a sample into the injection assembly and a transfer system for transferring a sample from the injection port to a port of a column of the LC stream.

Embodiment 26. The method of embodiment 25, wherein the injection assembly is connected to a pump and a waste container, and wherein the transfer system is configured to switch between different states connecting two or more of the pump, the waste container, the injection port and the port of the LC column in different configurations.

Embodiment 27. A computer system being configured to carry out the steps of any one of the methods of embodiments 1 to 26.

Embodiment 28. The computer system of embodiment 27, wherein the computer system is a controller of the automated analyzer.

Embodiment 29. A computer-readable medium having instructions stored thereon which when executed by a computer system prompt the computer system to carry out the steps of any one of the methods of embodiments 1 to 26.

What is claimed is:

1. A method of monitoring a state of a liquid chromatography (LC) stream of an automated analyzer, the method comprising:
executing, by at least one processor of a computer system configured to monitor the state of the LC stream of the automated analyzer, instructions stored in at least one memory of the computer system that cause the at least one processor to automatically:
inject, using a pump during an injection process, a sample of biological material into an LC column of the LC stream of the automated analyzer;
monitor a system pressure of an injection assembly of the LC stream during the injection process of the sample of biological material into the LC column of the LC stream to generate a time series of system pressures, wherein the time series of system pressures spans at least a portion of the injection process of the sample of biological material into the LC column of the LC stream;
classify the time series in one of two or more predetermined classes indicating different states of the LC stream; and
trigger a response based on the classification result,
wherein to classify the time series in the one of two or more predetermined classes comprises to classify the time series based on the following predetermined classes: (i) a first class indicative of a partial injection of air into the LC stream; (ii) a second class indicative of a complete injection of air into the LC stream; and (iii) a third class indicative of an injection of an abnormal sample composition into the LC stream.

2. The method of claim 1, wherein to classify the time series in the one of two or more predetermined classes comprises to classify the time series using a classifier trained by a machine learning algorithm.

3. The method of claim 2, wherein to classify the time series in the one of two or more predetermined classes comprises to classify the time series using the classifier that is trained on historical pressure time series or on simulated pressure time series.

4. The method of claim 1, wherein to classify the time series in the one of two or more predetermined classes the comprises to perform a feature analysis of one or more predetermined features of the time series.

5. The method of claim 1, wherein to classify the time series in the one of two or more predetermined classes comprises to classify the time series based on a fourth class indicative of an injection of a sub-nominal amount of sample and/or indicative of an injection of an above normal amount of sample.

6. The method of claim 1, wherein the third class indicative of the injection of the abnormal sample composition is indicative of at least one unexpected substance.

7. The method of claim 6, wherein the at least one unexpected substance is an unexpected organic substance, or a composition in which an expected substance is missing.

8. The method of claim 1, wherein to classify the time series in the one of two or more predetermined classes comprises to classify the time series based on a fifth class indicative of a normal operation of the injection assembly.

9. The method of claim 1, wherein to trigger the response based on the classification result comprises to cause the at least one processor to start or schedule an automatic maintenance operation.

10. The method of claim 1, wherein to trigger the response based on the classification result comprises to cause the at least one processor to ask an operator to perform a predetermined check or maintenance operation.

11. The method of claim 10, wherein executing the instructions stored in the at least one memory of the computer system further causes the at least one processor to provide instructions regarding the respective check or maintenance operation.

12. The method of claim 10, wherein to ask the operator to perform the predetermined check or maintenance operation comprises to cause the at least one processor to ask the operator to check the injection assembly for bubbles or check a sample dilution process.

13. The method of claim 1, wherein to trigger the response based on the classification result comprises to cause the at least one processor to inform a service provider.

14. A computer system comprising:
  at least one processor; and
  at least one memory having instructions stored therein, wherein the instructions are executable by the at least one processor to cause the at least one processor to carry out the steps of claim 1.

15. At least one non-transitory computer-readable medium having instructions stored thereon which when executed by a computer system prompt the computer system to carry out the steps of claim 1.

16. The method of claim 1, wherein executing the instructions stored in the at least one memory of the computer system further causes the at least one processor to avoid monitoring the system pressure of the injection assembly of the liquid chromatography stream during an LC gradient process.

17. The method of claim 16, wherein executing the instructions stored in the at least one memory of the computer system further causes the at least one processor to avoid generating the time series of system pressures during the LC gradient process.

18. The method of claim 17, wherein executing the instructions stored in the at least one memory of the computer system further causes the at least one processor to avoid classifying the time series of system pressures during the LC gradient process.

* * * * *